United States Patent [19]

Dougherty

[11] Patent Number: 4,674,191
[45] Date of Patent: Jun. 23, 1987

[54] METHOD AND APPARATUS FOR PRODUCING REGISTERED MULTIPLE OVERLAY ARCHITECTURAL DRAWINGS IN A COMPUTER AIDED DRAFTING SYSTEM

[76] Inventor: Paul D. Dougherty, 1420 Forest Side Ct., Nashville, Tenn. 37221

[21] Appl. No.: 882,829

[22] Filed: Jul. 7, 1986

[51] Int. Cl.[4] .................. G01D 9/00; G01D 15/28
[52] U.S. Cl. .................................... 33/613; 346/1.1
[58] Field of Search .................. 33/180 R, 181 R; 346/1.1, 139 R

[56] References Cited

U.S. PATENT DOCUMENTS

| | | | |
|---|---|---|---|
| 4,015,034 | 3/1977 | Smolen | 33/180 R |
| 4,443,949 | 4/1984 | Newton | 33/180 R |
| 4,463,673 | 8/1984 | Moore | 33/180 R |
| 4,598,298 | 7/1986 | Groenke et al. | 346/1.1 |

Primary Examiner—Richard R. Stearns
Attorney, Agent, or Firm—Mark J. Patterson

[57] ABSTRACT

Pre-punched drafting sheets are placed in a pin registration bar and pin holes are marked or punched in the lower corners of the sheets at locations with fixed reference to the registration holes. The sheets are then loaded into a CAD pen plotter and the plotter is used to precisely locate and store the location of the 2 pin holes as the plot beginning and X-axis alignment points.

2 Claims, 5 Drawing Figures

METHOD AND APPARATUS FOR PRODUCING REGISTERED MULTIPLE OVERLAY ARCHITECTURAL DRAWINGS IN A COMPUTER AIDED DRAFTING SYSTEM

BACKGROUND OF THE INVENTION

This invention relates to a method for producing architectural and engineering drawings on a pen plotter as part of a computer aided drafting (CAD) system such that the CAD plots are accurately aligned, or registered, with other CAD plots or manually produced drawings for use on the same project.

The use of CAD Systems has become more common in the production of architectural and engineering drawings because of the speed, accuracy, and repeatability of such systems. The drawings or plots produced by such systems are most often generated either on electrostatic or pen plotters. The present invention is intended for use in conjunction with pen plotters, which are generally more efficient in producing translucent overlay drawings. Specifically, the present invention is intended for use with pen plotters which primarily use the physical movement of the plotting medium to produce the plot, such as the Hewlett Packard 75xx series.

It is still necessary when producing architectural drawings on CAD Systems to integrate or accommodate manually produced drawings. For example, some designers and consultants must manually add their design portions to pre-existing CAD plots (base drawings) as part of the design routine. Or, the capacity of the CAD System to accommodate simultaneous design efforts may be exceeded, forcing some designers to manually create their drawings.

It is essential that a method exist for precisely aligning each separate project drawing or CAD plot (overlay). That is, when the various overlays are viewed together, or in conjunction with a base drawing, each common design element or reference point must be physically located at the same point on each drawing so that the designer or viewer will get an accurate picture of the overall design and how the various design features fit together. For example, when the drawings or plots are ready for inclusion into the contract documents, a method must be available for aligning the overlays which are then reproduced or photographed as a composite design drawing.

At present, the typical method for producing registered plots on pen plotters which move the plotting medium is to use an unpunched translucent drafting sheet. The sheet is placed on the plotter and then the plotter is directed to plot two or three or more crosshair targets (registration marks) at or near the borders of the sheet. Each sheet which is to become a base or overlay drawing on the project must be plotted with consistent reference to these registration marks.

After the sheets are plotted with the registration marks, they are placed, on a light table, in a standard 7-pin bar registration punch. The sheet is then secured, punched, and the registration marks are also placed on the light table in exact alignment with those on the sheet. Each successive sheet on which registration marks have been plotted can then be placed on the punch, visually aligned with the registration marks on the light table and then punched with the seven registration holes. The result will be a succession of sheets on which the registration marks are physically located in the same place with respect to the bar pin holes. The overlays can then be simultaneously viewed in registration when placed on a standard 7-pin registration bar.

The post-punch method just described works well but is prone to human error. An error of even one-sixteenth of an inch in visually aligning the registration marks will result in an out of registration plot. This poses a significant problem in large projects which can involve more than two hundred punched drawings.

Existing pre-punch and post-punch production and registration methods are generally described in "CAD PRODUCTIVITY A SYSTEMS APPROACH" (E. I. DuPont de Nemours and Co. 1985).

U.S. Pat. No. 4,440,080 discloses a technique for registering multiple color screens on a flat bed printer.

U.S. Pat. No. 3,398,637 relates to an apparatus for optically registering printing and model surfaces.

U.S. Pat. No. 3,763,730 discloses an optical hole punch for registration of printed circuit board artwork.

Japanese Pat. No. 55-82009 describes a system for optically aligning printed circuit board artwork.

What is needed, then, is a means of producing multiple overlay CAD plots and aligning them with each other and with manually generated drawings with consistent precision while using a conventional pen plotter and registration bar.

SUMMARY OF THE INVENTION

The present invention is directed to a method for producing registered multiple overlay CAD plots and manual architectural and engineering drawings. Specifically, the method employs conventional pre-punched drafting sheets, a pen plotter which moves the plotting medium to produce the plot, a standard registration bar, and a means for punching or marking registration holes on the sheet which then form the reference points for the pen plotter.

The drafting sheets are pre-punched with standard 7-pin bar registration holes and placed on the 7-pin registration bar. Other registration bars, with more or less than 7 holes can also be used. A template containing a marking means, such as a means for punching small holes in the drafting sheets, is placed over the pin bar and drafting sheets. Two pin holes are then punched in or marked on the lower left and right corners of the sheets at points which are consistently physically located with reference to the seven pin-bar registration holes.

The pre-punched sheet with the pin holes is then placed in a pen plotter and the precision plotter controls and magnifying eye piece are used to locate the two pin holes on the sheets. These pin holes are then stored as the plot beginning and X-axis alignment points for the plotter.

DESCRIPTION OF THE PREFERRED EMBODIMENT

Figure 5:
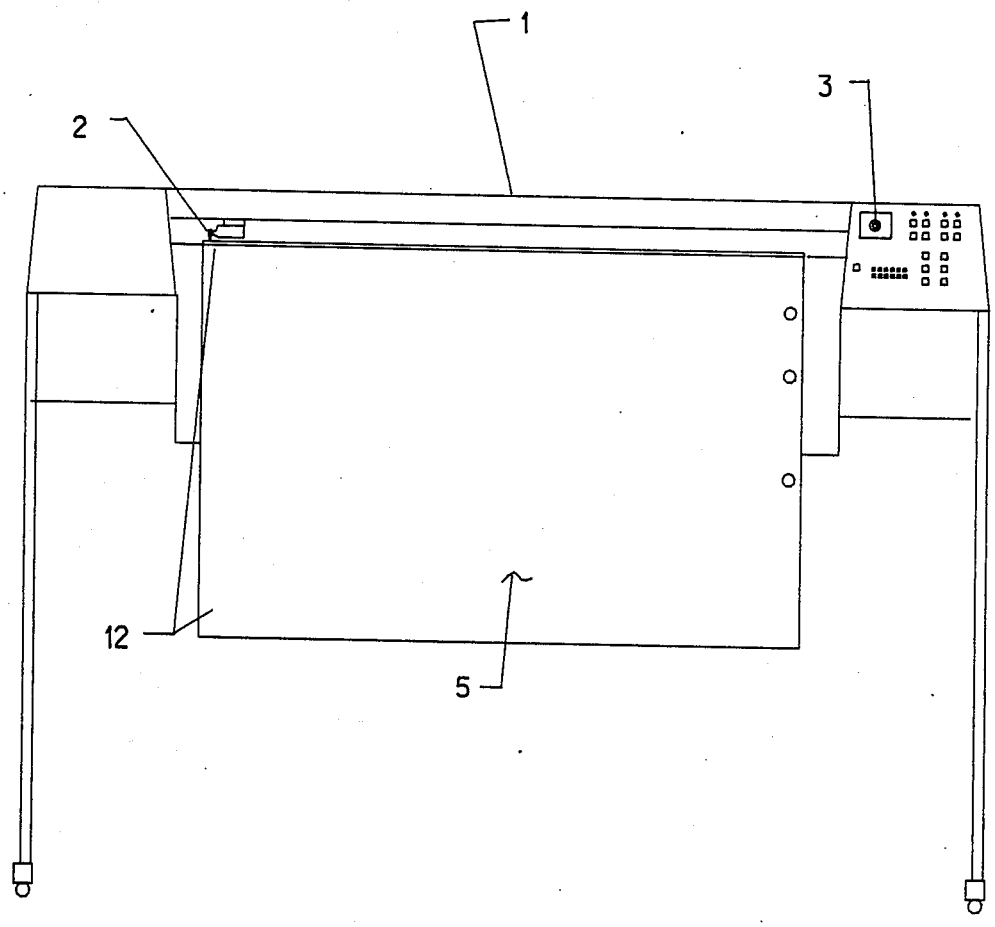
FIG. 5 shows the drafting sheet with registration marks punched mounted on a pen plotter used in conjunction with a CAD System.

The invention described herein is designed for use in conjunction with a CAD pen plotter 1 which produces the plot by primarily physically moving the plotting medium itself. The Hewlett Packard 75xx series plotter 1, as shown in FIG. 5, is a typical example of this type of plotter. Plotter 1 can be set up to plot consistently with reference to a "grid" such as the grid lines on a plan profile sheet. When a sheet is loaded into plotter 1, plotter 1 automatically establishes a plot beginning point (P1) and X-axis alignment point based on the physical edges of the sheet. Alternatively, the CAD operator can establish P1 and X-axis alignment points to coincide with known points on the sheet, by using precision plotter controls 3.

So that all plots and manually generated drawings on the same project can be viewed together in registration, or to allow for accurate reloading and additional plotting on the same sheet, the present method uses the seven holes made on a standard 7 pin bar registration punch as the reference "grid" line. That is, the present method is directed at consistently relating the P1 and X-axis points, which can be stored by plotter 1 to the seven pin bar registration holes on the pre-punched drafting sheet.

Figure 1:
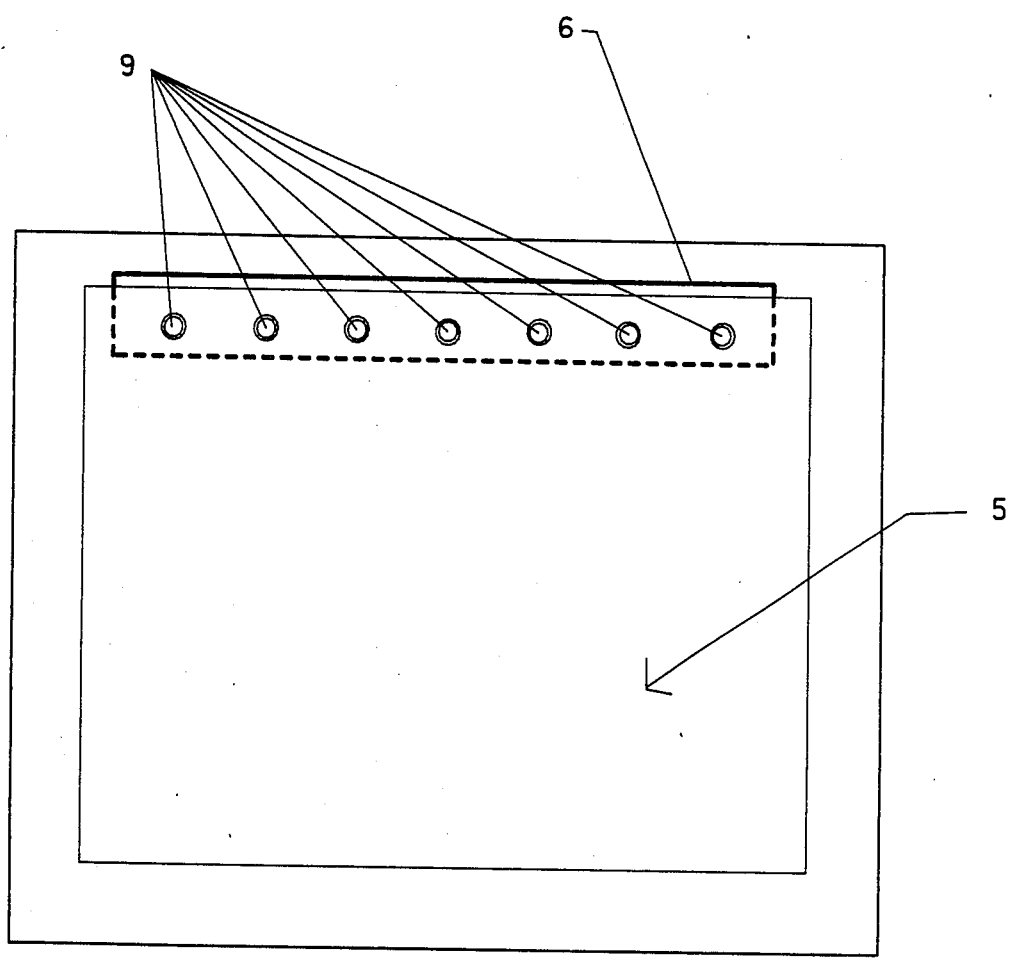
FIG. 1 is a top view of a pre-punched drafting sheet mounted on a drafting table and standard 7-pin registration bar.
Figure 2:
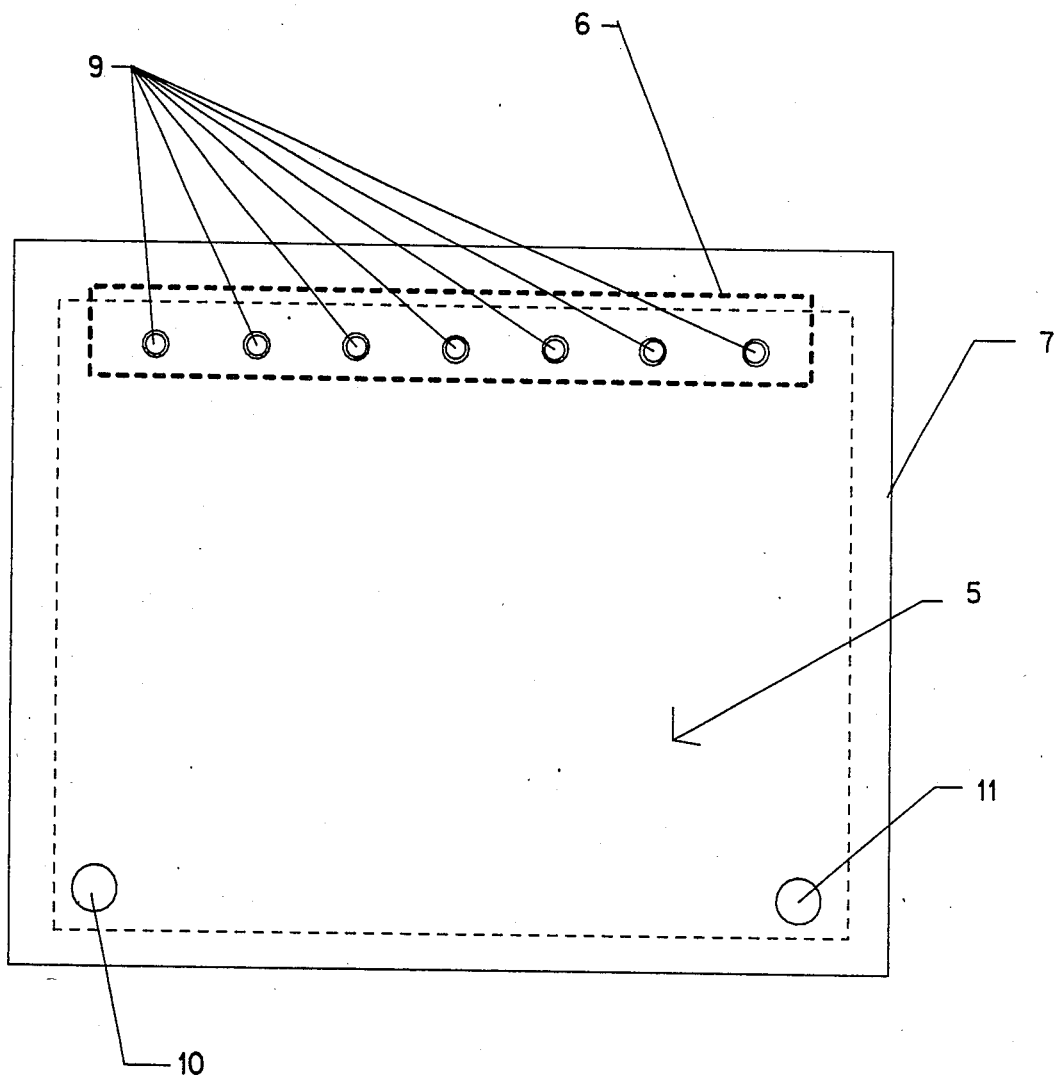
FIG. 2 is a top view of the template, containing punching means, placed over the 7-pin registration bar and drafting sheet.
Figure 3:
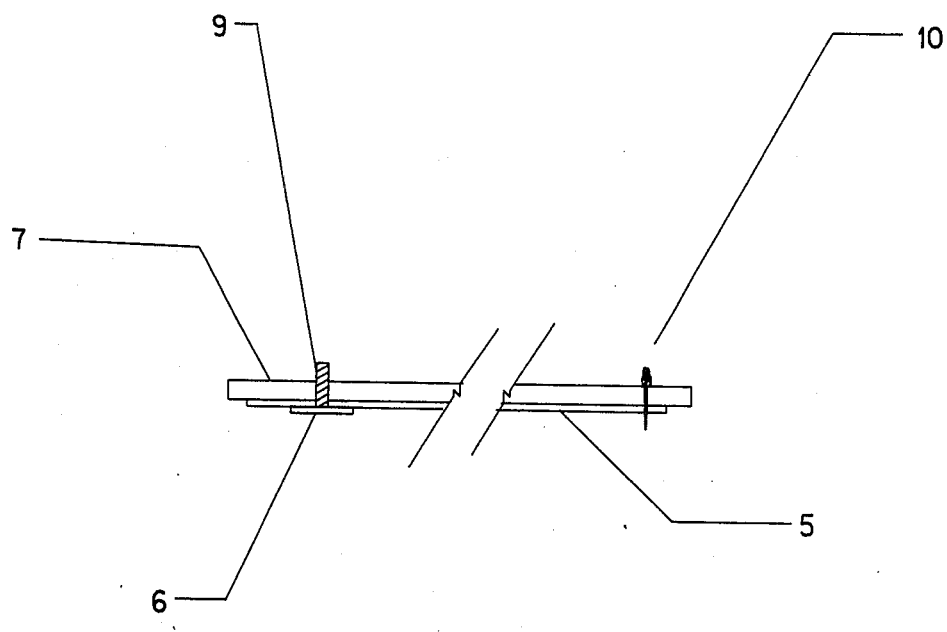
FIG. 3 is a side view of the drafting sheet, registration bar, and template with punching means.
Figure 4:
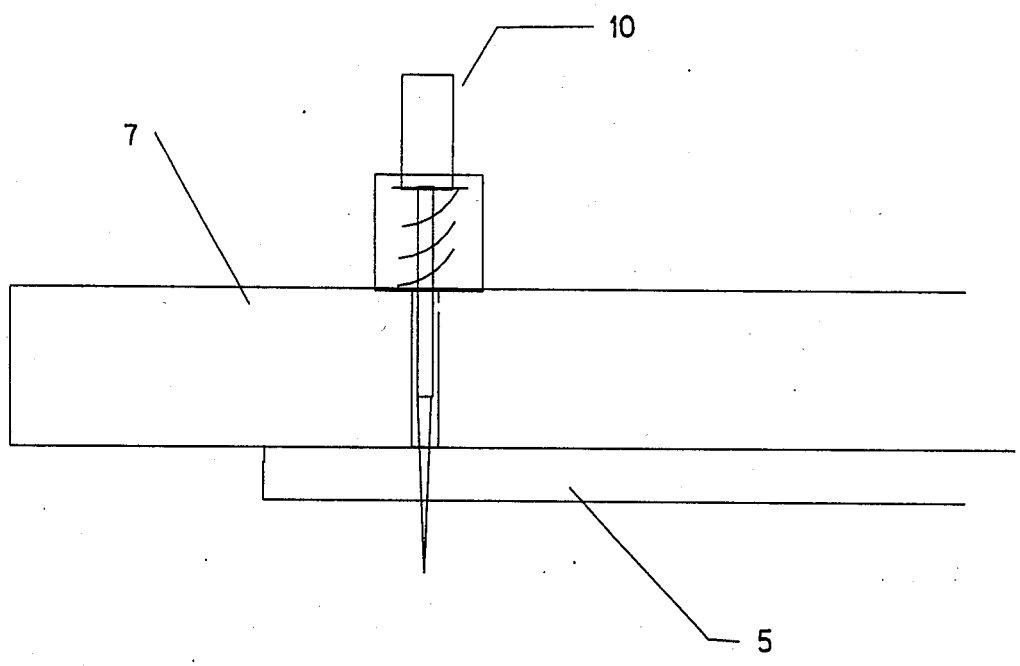
FIG. 4 is a close-up side view of the punching means and template.

To accomplish this, as shown initially in FIGS. 2 and 3, a number of pre-punched drafting sheets 5 are placed on pin bar 6. Template 7, made of plexiglass or other rigid clear material is placed over pin bar 6 and sheets 5 by use of 7 holes located at the top edge of template 7, which holes are pre-drilled to match up with the 7 small pins 9 on pin bar 6. Template 7 is sized to slightly exceed the dimensions of a standard pre-punched drafting sheet.

Located at and through the lower left corner of template 7 is a means for marking P1, such as P1 punching means 10 which, when pressed by the operator, punches a small pin hole in sheets 5. In the lower right corner of template 7 is located a similar means for marking X-axis points, X-axis punching means 11, which is also used to make a small pin hole in sheets 5. Punching means 11 is located such that the imaginary line between punching means 10 and 11 is approximately parallel with the lower horizontal edge of sheets 5. After the two pin holes 12 are punched in sheets 5 with punching means 10 and 11, template 7 is removed and one of sheets 5 is loaded into plotter 1.

Other means for marking P1 and X-axis alignment points can be used and are claimed as part of the method described and claimed herein, as long as such means produces pin holes or marks which are consistently located with reference to the pin bar registration holes. Also, the method can be used with pin bars having more or less than seven pins.

By using precision plotter controls 3 and magnifying view finder 2, also located on plotter 1, the operator directs the plotter precisely to pin holes 12 on sheets 5 and stores their location in the memory of plotter 1. This establishes in the plotter memory the plot beginning point (P1) and X-axis alignment point. These physical points relate to the geometrically defined points previously established in computer memory. Sheet 5 is then plotted, as are additional pre-punched sheets which have already been punched with pin holes 12 by template 7. These sheets, as well as pre-punched sheets that have been manually drawn with the same P1 and X-axis points, can then be viewed as accurately registered overlays when placed back together on pin bar 6. Similarly, sheet 5 can be partially plotted, removed from plotter 1, then returned for further plotting with accurate registration.

What is claimed then is:

1. A method for producing multiple architectural and engineering project drawings using computer aided drafting systems and/or manual drafting techniques such that the drawings are accurately visually aligned or registered with all other drawings on the same project, where such method employs: drafting sheets which are pre-punched for use on a pin registration bar; a pin registration bar; a computer aided drafting system with a pen plotter, said plotter having a means for visually magnifying the location to be plotted and a manual control means for precisely moving the plotter pen to the location to be plotted; a means for marking two pin size holes in the sheets with consistent reference to the pre-punched registration holes on the sheets, such method comprising the steps of:
   (a) placing a pre-punched drafting sheet on the pin registration bar;
   (b) marking two pin size holes at the lower left and right edges of the drafting sheet with said marking means;
   (c) loading the pre-punched drafting sheet in the pen plotter;
   (d) visually locating the pin holes on the sheet using said visual magnifying means and manual control means;
   (e) storing the location of the pin holes in the plotter as the plot beginning and X-axis alignment points;
   (f) plotting or manually drafting all drawings to be used on the same project on said drafting sheet using the same pin hole plot beginning and X-axis alignment points.

2. The method of claim 1 where said marking means comprises:
   (a) a template of a rigid translucent material, said template being slightly larger than a standard pre-punched drafting sheet and having horizontally aligned holes along its top edge to correspond with the pins located on a pin registration bar;
   (b) two means located at and through the lower left and right hand corners of said template, adapted for marking pin size holes on drafting sheets placed on a pin registration bar and underneath said template.

* * * * *